J. C. McGOWAN & R. W. MICHLER.
SIGNAL.
APPLICATION FILED OCT. 30, 1909.

1,019,340.

Patented Mar. 5, 1912.

2 SHEETS—SHEET 1.

Witnesses
William C. Sinlow
D. W. Gould.

Inventors
Joseph C. McGowan, and
Robert W. Michler.
By Victor J. Evans
Attorney

J. C. McGOWAN & R. W. MICHLER.
SIGNAL.
APPLICATION FILED OCT. 30, 1909.
1,019,340.
Patented Mar. 5, 1912.
2 SHEETS—SHEET 2.
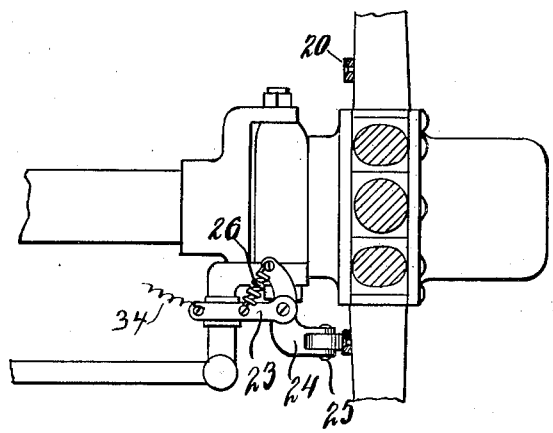
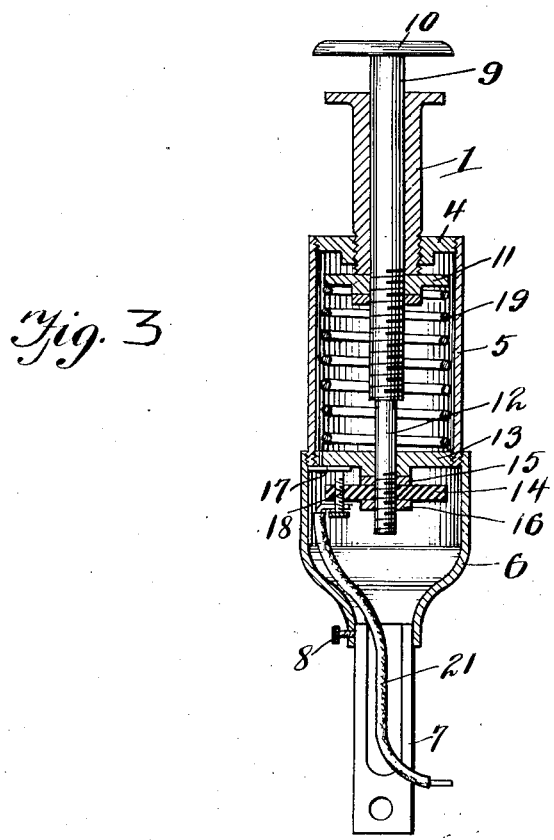
Witnesses
William C. Linton.
D. W. Gould.
Inventor
Joseph C. McGowan, and
Robert W. Michler.
By Victor J. Evans
Attorney

UNITED STATES PATENT OFFICE.

JOSEPH C. McGOWAN AND ROBERT W. MICHLER, OF PERRIS, CALIFORNIA, ASSIGNORS OF ONE-THIRD TO MATHIAS P. DEUTSCH, OF PERRIS, CALIFORNIA.

SIGNAL.

1,019,340.  Specification of Letters Patent.  Patented Mar. 5, 1912.

Application filed October 30, 1909. Serial No. 525,529.

*To all whom it may concern:*

Be it known that we, JOSEPH C. McGOWAN and ROBERT W. MICHLER, citizens of the United States, residing at Perris, in the county of Riverside and State of California, have invented new and useful Improvements in Signals, of which the following is a specification.

The invention relates to an improvement in signals designed for use in connection with pneumatic tires and adapted, when in service, to indicate any variation from the predetermined pressure within the tire, whereby upon the depletion of the tire, incident to puncture or leaking, the driver will be notified and thereby enabled to save tire damage incident to the use of a flat tire.

The main object of the present invention is the provision of a tire deflation signal including a normally open alarm or indicating circuit and circuit closer normally held inoperative while it is inflated with the predetermined pressure, the deflation of the tire through puncture of leaking serving to permit the automatic operation of the circuit closer to complete the circuit and sound the alarm or register the indication.

The invention in its preferred details of construction will be described in the following specification, reference being had particularly to the accompanying drawings, in which:—

Figure 1:
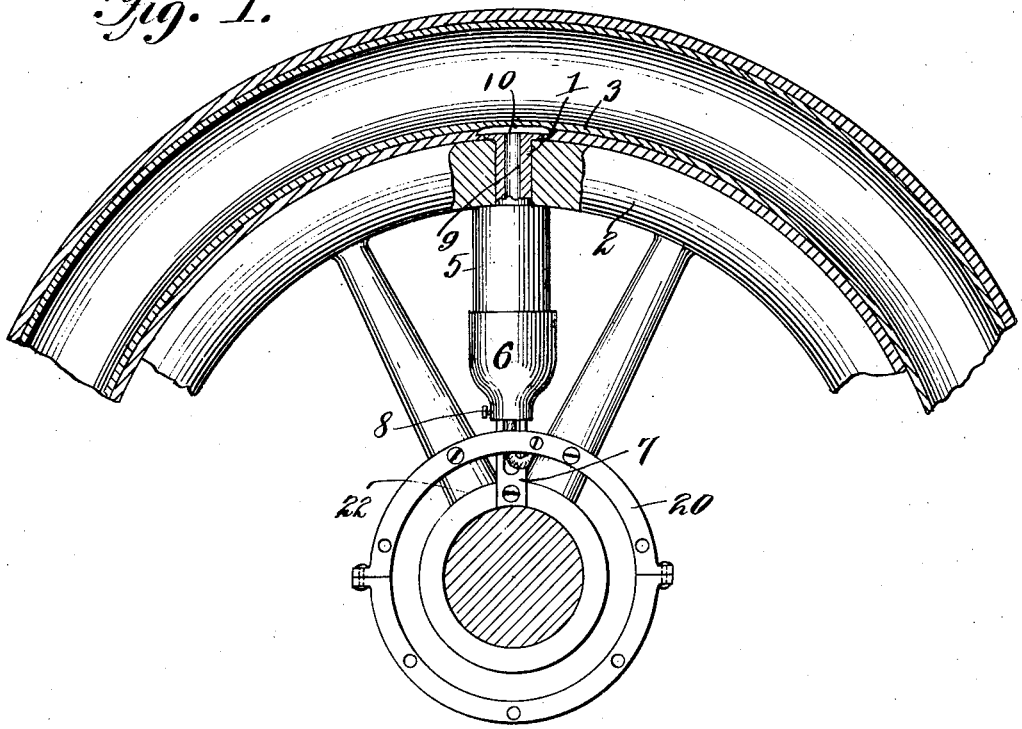
Figure 4:
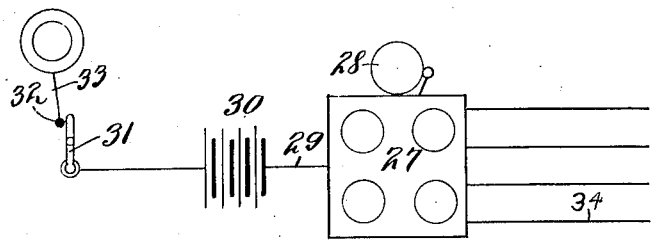

Figure 1 is a broken sectional view of a wheel, partly in elevation, illustrating the application thereto of our improved signal means. Fig. 2 is a horizontal sectional view taken through the wheel above the hub thereof, showing the frame carried portion of the signal means in elevation. Fig. 3 is a vertical sectional view, partly in elevation, of the circuit closer. Fig. 4 is a diagrammatic view illustrating the alarm and indicator and the wiring leading thereto.

Referring particularly to the accompanying drawings, the improved deflation alarm signal includes a circuit closing means automatically controlled by the pressure in the tire, said circuit closer comprises a sleeve member 1 designed to be fixed in a wheel felly 2 to underlie the inner tube 3 of the tire. The sleeve is secured in position by a nut 4 coöperating with the threaded end of the sleeve and bearing against the inner side of the felly, and through a nut which is threaded on its upper edge is secured the cylindrical casing 5. To the lower end of the casing and preferably threaded thereon is a cap member 6 the end of which is remote from the casing and is reduced in diameter and encircles a conduit member 7, being secured to the latter through the medium of a side screw 8 for the purpose which will presently appear.

Slidably mounted within the sleeve 1 is a stem 9 carrying on its upper end a disk 10 which is designed to underlie and engage the inner tube. That portion of the stem normally below the lower end of the sleeve 1 is threaded for the reception of an adjusting nut 11, the lower end of the stem being reduced at 12 and passing loosely through a disk 13 secured in the lower end of the casing 5. Beyond the disk 13 the stem is threaded and is engaged by a disk 14 of insulating material, the latter being secured in placed relation to the disk 13 by a threaded washer 15, a second washer 16 being threaded on the stem beneath the disk 14. To one edge of the metallic disk 13 there is secured a spring strip 17, and threaded through the disk 14 is a contact pin 18, the parts being so arranged that the strip 17 will be engaged by the contact pin 18 when the stem is at its limit of relatively upward movement. A coil spring 19 encircles the stem 9 between the disk 13 and the adjusting nut 11, operation of the latter serving to vary the tension of the spring as desired for a purpose which will presently appear.

A contact ring 20 is secured upon the spokes of the wheel, and said ring is connected with the pin 18 through the medium of a conductor 21, preferably insulated and passing through the conduit 7. The conduit 7 is extended and grounded through the hub of the wheel, as shown at 22.

Clamped upon a portion of the frame of the wheel, in the case of the rear wheels, and upon a portion of the steering gear in the case of the front wheels, is a supporting bar 23 which at the upper end supports an angle lever 24. The arm 23 is insulated from the supporting means but in electrical connection with the lever. The free or upper end of the lever carries a roller 25 designed to bear at all times upon the ring 20 secured upon the wheel, the inner end of the lever being connected through the medium of a spring 26 with the arm 23 so as to maintain the constant though yielding contact between the roller and ring.

A conductor 34 leads from the arm 23 to an indicator such as an annunciator which may or may not include an alarm 28. It will, of course, be understood that each of the four wheels is to be equipped with the device desired, and that the annunciator is to indicate which particular device is operating so that the particular tire needing attention can be readily noted. In this event, of course, the wire 34 from each wheel will be led into an annunciator, a common return therefrom, as 29, leading through batteries or other sources of energy 30 between a manual switch 31, the point 32 of which switch is in circuit through a conductor 33 with the axle or other frame part of the machine.

As desired, it will be noted that the annunciator is in circuit with each tire controlled device and that this circuit is broken only when the spring section 17 and the pin 18 are separated by the relatively inward movement of the stem 9.

In the arrangement of parts described it will be understood that as a tire is inflated the pressure exerted upon the stem 9 through its disk 10 will separate the points heretofore noted and maintain the circuit broken. Upon any decrease in the pressure in a tire through leakage or puncture, the spring 19 operates to force the plunger outwardly closing the circuit, sounding the alarm, and indicating on the annunciator what particular tire requires attention. By the adjustment of the tension of the spring 19 the device can be set to indicate a slight decrease in the pressure or to operate only when a tire is practically flat, being adjusted of course to any intermediate stage.

It will be noted that the pin 18 engages the spring strip 17 normally spaced at the pin engaging end from the disk. This makes a yielding contact at this point and obviates the excessive wear at this point incident to the travel of the vehicle. Furthermore, all parts exposed to the collection of dust and dirt are closed though they are readily opened for inspection or repair by releasing the set screw 8 and sliding the cap 6 outward upon the conduit 7.

Having thus described the invention, what we claim as new is:—

1. A tire deflation indicator comprising a circuit, an indicator included therein, said circuit being normally broken at one point, a tire pressure controlled circuit closer for governing the condition of the circuit at the point of break, said closer including a casing comprising a fixed cylinder, a cap secured thereon, and a conduit electrically grounded on the frame, said cap being slidably mounted on the conduit, a plunger operable within the cylinder in one direction by the tire pressure, a spring mounted within the cylinder for operating the plunger in the opposite direction, a fixed contact carried by the cylinder and a movable contact carried by the plunger, said contacts forming the terminals of the circuit closer.

2. A tire deflation indicator comprising a circuit, an indicator included therein, said circuit being normally broken at one point, a tire pressure controlled circuit closer for governing the condition of the circuit at the point of break, said closer including a casing comprising a fixed cylinder, a cap secured thereon, and a conduit electrically grounded on the frame, said cap being slidably mounted on the conduit, a plunger operable within the cylinder in one direction by the tire pressure, a spring mounted within the cylinder for operating the plunger in the opposite direction, a fixed contact carried by the cylinder and a movable contact carried by the plunger, said contacts forming the terminals of the circuit closer, a collecting ring secured upon the wheel, and a conductor between the movable contact and said ring, said conductor passing through the cap and conduit.

3. A tire deflation indicator comprising a circuit, an indicator included therein, said circuit being normally broken at one point, a tire pressure controlled circuit closer for governing the condition of the circuit at the point of break, said closer including a casing comprising a fixed cylinder, a cap secured thereon, and a conduit electrically grounded on the frame, said cap being slidably mounted on the conduit, a plunger operable within the cylinder in one direction by the tire pressure, a spring mounted within the cylinder for operating the plunger in the opposite direction, a fixed contact carried by the cylinder and a movable contact carried by the plunger, said contacts forming the terminals of the circuit closer, a collecting ring secured upon the wheel, a conductor between the movable contact and said ring, said conductor passing through the cap and conduit, and a spring member arranged in the circuit and bearing upon the ring.

In testimony whereof we affix our signatures in presence of two witnesses.

JOSEPH C. McGOWAN.
ROBERT W. MICHLER.

Witnesses:
 MATHIAS P. DEUTSCH,
 WILBERT G. STEWART.